April 20, 1954 — A. GENTILINI — 2,675,735
CINEMATOGRAPHIC FILM FEEDING DEVICE UTILIZING FIXED TOOTH
Filed Dec. 10, 1948

INVENTOR
AUGUSTO GENTILINI

BY *Haseltine Lake & Co.,*

AGENTS

Patented Apr. 20, 1954

2,675,735

UNITED STATES PATENT OFFICE 2,675,735

CINEMATOGRAPHIC FILM FEEDING DEVICE UTILIZING FIXED TOOTH

Augusto Gentilini, Milan, Italy

Application December 10, 1948, Serial No. 64,478

Claims priority, application Italy September 3, 1948

1 Claim. (Cl. 88—18)

1

The present invention relates to cinematographic apparatus, and more particularly to a film feed device for causing intermittent forward movement of the film past an aperture at which the film pauses for a brief moment to enable the projection therethrough of a beam of light.

Cinematographic apparatuses known at present are equipped with a mechanical device causing the intermittent advancement of the film and acting upon the film in the direction of advancement of the film section which is projected or shown. This mechanism is always rather complicated inasmuch as it is conceived to make the film advance passively, the film functioning merely as a transported body.

According to the present invention, based on the observation that the film is elastically flexible, the flexure strain of the film is utilised to control the intermittance of its displacements, alternated with periods of rest. To this end, the device according to the present invention comprises a stationary resting surface for the film, which surface is provided with an opening for the passage of light and with at least one tooth positioned to engage the perforations of the film, means causing uniform advancement of the film in a direction not parallel to the said surface so as to move it away from the said surface, and means causing the advancement of the film at a point before the said means of uniform advancement.

Figure 1:
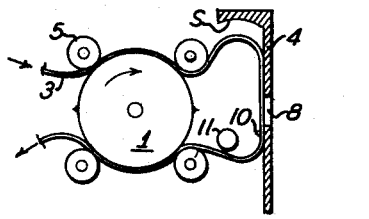
Figure 2:
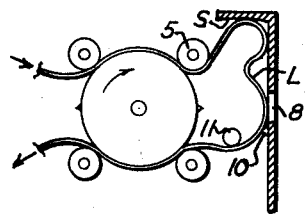

The elasticity of the film can be advantageously utilised to keep against the said surface the convex side of a bent section of the film confined between two parts of one member which causes the continuous advancement at uniform speed before and after the passage of the film over the said surface, the disengaging of the tooth or teeth from the perforation always taking place as a consequence of an elastic flexure of the film, which is followed by a forward displacement of the film section or loop resting on the said surface, until the said fixed tooth engages with the subsequent hole, after which the cycle of straining the film by flexure and consequently advancing it intermittently in register with the beam of light is repeated. The way of operation and of putting into practice the device according to the invention, will more clearly appear from the more detailed description hereinafter given with reference to the accompanying drawings which represent the device merely by way of example. In these drawings:

Figures 1 and 2 represent two stages of operation according to the invention diagrammatically;

2

Figure 3:
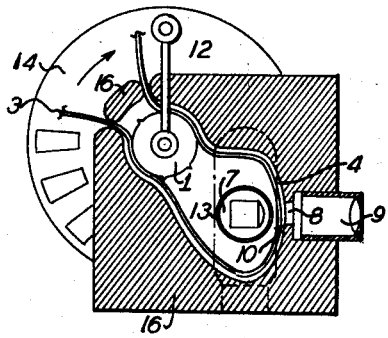
Figure 4:
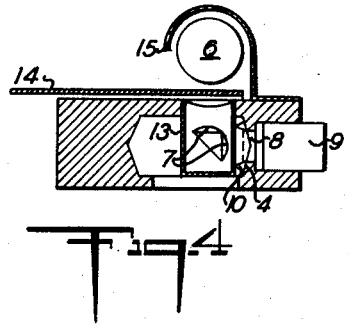
Figure 5:
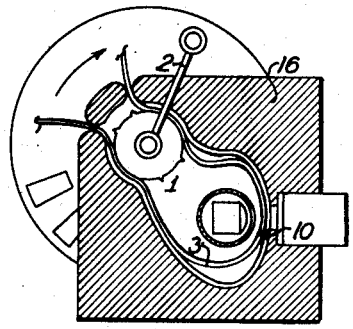
Figure 6:
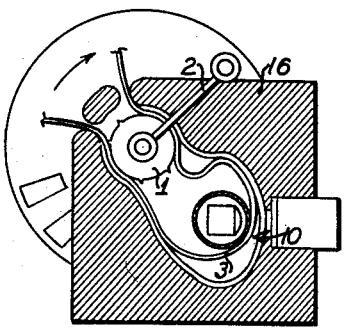

Figures 3, 5 and 6 represent a section of an apparatus built according to the invention, in three stages of operation; and Fig. 4 is a section of Fig. 3 according to the line X—X.

With reference to the diagrams of Figures 1 and 2, the device is composed of a wall 4 on which the film 3 rests or is in any way kept adherent in register with a projection slot 8 and a tooth 10 penetrating into one of the holes of the film perforation; a roller 1 causes the film to advance with uniform movement in the direction indicated by the arrows and produces a curved film section corresponding with the section adherent to the surface 4.

As the roller 1 causes with uniform movement the film to advance and to be withdrawn from the wall 4, roller 1, moving in the direction indicated by the arrow, causes the film to depart from the position of Fig. 1 and to assume the position of Fig. 2, one of its holes always remaining engaged with the tooth 10; in this latter position, however, the film rests against a member 11, which is fixed, and it is bent further, thus detaching itself from the tooth 10; the film loop which has formed meanwhile above, causes by elastic reaction advancement of the film until another hole meets with the tooth 10 (Fig. 1), thus repeating the cycle.

An example of cinematographic apparatus built according to the diagram of Figures 1 and 2 is represented in Figures 3 to 6. The apparatus is constituted by a body 16 on which are mounted the film feeding and projecting members. The roller 1 actuated by the winch 12 pushes the film 3 against the inner wall 4, which is shaped in such a manner as to compel the film to engage with the tooth 10, only if the film is not in tension below but adhering approximately all around the said profile (Fig. 3). While rotation of the roller 1 is going on, for example, by means of the winch 12, a loop curl is forming with the film above the projection slot 8 (Fig. 6), while below, the film begins to be tensioned, but is not yet able to disengage from the tooth 10 and, therefore, remains unmoved in front of the slot. Further rotation of the roller 1 (Fig. 5) makes the film adhere below to the central block 13 corresponding to the member 11 of Figures 1 and 2 and, therefore, disengage from tooth 10. At the same time, the upper loop or curl, notably enlarged, will tend to flatten, making the film, freed from the tooth, jump downwards, and engage again at once with the tooth, by means of the subsequent holes, and so on.

If the profile and surface of the wall 4 does not cause excessive friction with the film, disengaging and re-engaging of the film with the tooth 10 may be attained even without the central block 13, that is to say, only by the action of the upper loop, which will be more or less simple.

With this form of the invention, it is not necessary that the wall 4 be constituted by a continuous surface, it may be even constituted by separated and spaced sections, or it may be replaced by a succession of supports, for example pins or rollers arranged along the theoretical surface, the said succession of supports being an equivalent of the said wall for the purpose set forth.

The shutter 14 is fitted in phase onto the axle of the roller 1, that is to say, in such a manner as to interpose itself with one of the shutter sectors between a lamp 6 and a condenser and prism system 7 (Fig. 4) during the stage of film clicking, leaving free passage to light during the stage in which the film is engaged with the tooth 10.

This form of embodiment of the invention is convenient for simplified constructions, as the body of the apparatus 16 can be cast in one piece (or in two pieces to make extraction from the mould easier), preferably in plastic material or in diecast metal, with the sole protection 15 for the lamp being the only structure requiring to be built up. With the application of a handwheel, not shown in the figure, on the axle of the roller 1, in a way analogous to the shutter, or with the application of a relatively heavy shutter disc, it is possible to obtain an apparatus for the direct inspection of the film, to be actuated while keeping the apparatus reversed in one hand, and applying the eye to the hole of the objective 9 and dragging the film downwards with the other hand.

The same apparatus, if secured to a plane horizontally and flanked by two or more reels, may constitute a mounting table or "moviola."

Having now particularly described and ascertained the nature of my said invention and in what manner the same is to be performed, I declare that what I claim is:

A device for causing intermittent forward motion of the film in cinematographic apparatus comprising means defining a chamber including a wall portion positioned to support one face of the film and containing an aperture for the passage of light, a tooth in said wall portion closely adjacent and beyond said aperture along the path of movement of the film, said tooth projecting into said path and of a size to penetrate into the perforations of the film, a sprocket defining a first driving surface for feeding the film with uniform speed into the chamber toward said wall portion and a second driving surface for withdrawing the film with the same uniform speed away from said wall portion to disengage it from said tooth and out of the chamber, said chamber including a film contacting surface preceding said aperture in the path of movement of the film defining a fixed boundary at the end of said wall portion remote from said aperture thereby enabling the film to form a compression loop away from said contacting surface when a perforation is penetrated by said tooth and the length of film fed by said first driving surface exceeds the length normally accommodated in the chamber, and a stationary member positioned substantially centrally in the chamber to be contacted by and to tension the film as it is withdrawn from said tooth thereby to enable intermittent expansion of said loop with snap action due to inherent resiliency of the film as successive perforations of the film disengage from said tooth without total loss of the loop.

References Cited in the file of this patent

UNITED STATES PATENTS

| Number | Name | Date |
|---|---|---|
| 1,244,920 | Thomas | Oct. 30, 1917 |
| 1,545,195 | Nogues | July 7, 1925 |
| 1,874,908 | Craig et al. | Aug. 30, 1932 |
| 1,898,850 | Papo et al. | Feb. 21, 1933 |

FOREIGN PATENTS

| Number | Country | Date |
|---|---|---|
| 222,755 | Great Britain | Oct. 9, 1924 |
| 426,084 | Italy | Oct. 21, 1947 |